United States Patent [19]

Kainz

[11] Patent Number: 4,815,506
[45] Date of Patent: Mar. 28, 1989

[54] TREE HARVESTING AND LOGGING SYSTEM

[76] Inventor: Andrew N. Kainz, P.O. Box 506, Ely, Minn. 55731

[21] Appl. No.: 177,087

[22] Filed: Apr. 4, 1988

[51] Int. Cl.⁴ .............................................. B27L 1/00
[52] U.S. Cl. .................... 144/2 Z; 144/343; 414/694
[58] Field of Search ............... 414/694; 144/2 Z, 3 D, 144/34 R, 343; 37/2 R

[56] References Cited

U.S. PATENT DOCUMENTS

| | | | |
|---|---|---|---|
| 2,505,923 | 5/1950 | Taylor et al. | 37/2 |
| 2,989,097 | 6/1961 | Bombardier | 144/208 |
| 3,498,350 | 3/1970 | Maradyn | 144/34 R |
| 3,590,760 | 7/1971 | Boyd et al. | 144/3 D |
| 3,809,134 | 5/1974 | McCabe | 144/2 Z |
| 3,974,866 | 8/1976 | Saarenketo | 144/3 D |
| 4,056,134 | 11/1977 | Bakowski | 144/2 Z |
| 4,083,463 | 4/1978 | Ericsson | 144/34 R |
| 4,124,047 | 11/1978 | Dressler et al. | 144/3 D |
| 4,412,777 | 11/1983 | Forslund | 144/34 R |
| 4,582,104 | 4/1986 | Sigouin | 144/2 Z |

Primary Examiner—W. Donald Bray
Attorney, Agent, or Firm—Leonard Bloom

[57] ABSTRACT

A logging system including a delimbing head, a tree butt holder and a feller buncher head. The delimbing head is a simple device that may be removably attached to the blade of a power unit, such as a skidder. The delimbing head is indirectly secured to the power unit by a four-way swivel that enables the delimbing head to freely float, so as to follow the movement of the tree being delimbed without binding and digging into the tree. The tree butt holder includes a plate having at least one notch formed therein. The notch is lined with a plurality of gripping teeth, such that when a tree is loaded in the notch, when the holder is centered, the tree may then be moved forward or backward causing the teeth to grip, secure and hold the tree. The feller buncher head is secured to a motorized vehicle being pivotally attached thereto at the lower end thereof. A winch, includes a cable which is attached to the upper end thereof. A power saw is carried by the buncher head for felling the tree. A holder embraces the tree so that when the tree is felled, the tree pivots the feller buncher head from a cutting position to a felled position. The winch is utilized to return the feller buncher head to the cutting position.

8 Claims, 5 Drawing Sheets

TREE HARVESTING AND LOGGING SYSTEM

FIELD OF THE INVENTION

The present invention relates to tree harvesting and logging systems and, in particular, to delimbing heads, tree butt holders and feller buncher heads.

BACKGROUND OF THE INVENTION

Tree harvesting operations include, inter alia, the felling of trees to be harvested and the delimbing of the felled trees.

Presently, the operations of felling and delimbing trees are either performed manually or by the use of highly specialized machines. In the former case, by the manual is use of an axe or mechanical saw, the trees are first felled and are then delimbed. Such manual operations require considerable time and is only minimally cost effective. The latter case, while being much quicker, requires the use of specialized machines which are rather complicated, of large size and are quite expensive. Hence, where a smaller logging operation is involved (such as a family operation) such equipment is rather impractical and is of limited cost effectiveness, especially when the market prices for lumber are low.

It has been recognized that it would be desirable to provide simpler tree felling and delimbing devices. Various types of tree feller and delimbing devices of which I am aware are listed as follows:

| Inventor(s) | Patent No. | Issue Date |
| --- | --- | --- |
| Taylor et al | 2,505,923 | 1950 |
| Bombardier | 2,989,097 | 1961 |
| Boyd et al | 3,590,760 | 1971 |
| McCabe | 3,809,134 | 1974 |
| Saarenketo | 3,974,866 | 1976 |
| Bakowski | 4,056,134 | 1977 |
| Dressler et al | 4,124,047 | 1978 |
| Sigouin | 4,582,104 | 1986. |

Unfortunately, all of the above-noted references are still either rather expensive and/or complicated. Also, the delimbing devices and feller heads of these devices have limited lateral and/or transverse movement. Thus, during the felling and delimbing operations, movement of the tree being felled and delimbed results in the device binding and digging into the tree. This can result in damage, at least in part, to the tree which further limits the cost effectiveness of these devices.

Thus, it can be seen that there remains a need for tree felling and delimbing devices which are simple, relatively cheap, adapted to be readily secured to and removed from conventional devices, such as a skidder blade commonly utilized in most logging operations (even in small operations) and in which the delimbing device is able to freely float, so as to follow the movement of the tree being delimbed without binding and digging into the tree.

SUMMARY OF THE INVENTION

Accordingly, it is a primary object of the present invention to provide tree felling and delimbing devices which are simple, relatively cheap in cost and which are readily adaptable for use in small logging operations utilizing conventional devices.

It is a further object of the present invention to provide a delimbing device which is capable of freely floating so as to follow the movement of a tree being delimbed thereby, so as not to bind and dig into the tree.

In accordance with the teachings of the present invention, there is disclosed a delimbing head of the type carried by a motorized vehicle for removing limbs from the trunk of a tree. This delimbing head includes a housing. A pair of delimbing jaws are provided. Each of these jaws are pivotally connected to the housing about a respective pivot point for pivotal movement between a first closed delimbing position and a second open releasing position. Each of these jaws has a respective cutting edge formed thereon. Each of these cutting edges is oriented facing the other cutting edge. A pair of cylinders are provided. Each cylinder has a respective piston slidably disposed therein. Each piston has a drive end which extends from the cylinder and which is secured to a respective delimbing jaw. In this fashion, the sliding movement of each piston pivots one of the jaws therewith between the first closed and the second open positions. A four-way swivel is connected between the motorized vehicle and the housing, such that the housing having the delimbing jaws carried thereon pivots up and down and side to side. In this manner, when in the first delimbing position, the head floats following the tree trunk without bending. The housing further includes a pair of cutting edges which are formed thereon. Each of the cutting edges are substantially contiguous with a respective cutting edge formed on a delimbing jaw. A substantially hollow mounting tube is secured to the motorized vehicle. An extension tube is provided which has a first end and a second opposite end. The extension tube is telescopically slidably received in the mounting tube having a length, including the first end, extending outwardly therefrom. In this manner, the extension tube may be slidably adjusted in the mounting tube for varying the length of the extension tube extending outwardly therefrom. The swivel is secured to the first end of the extension tube. At least one aperture is formed through the mounting tube. A plurality of spaced apertures are formed in the extension tube. In this fashion, the extension tube may be slidably adjusted in the mounting tube for varying the length of the extension tube extending outwardly therefrom with at least one of the spaced apertures formed in the extension tube being aligned with the aperture of the mounting tube. Finally, at least one mounting pin is removably received in both the aperture formed in the mounting tube and the aperture of the extension tube being aligned therewith. This mounting pin secures the extension tube in its slidably adjusted position, thereby precluding further movement of the extension tube in the mounting tube.

In further accordance with the teachings of the present invention, there is disclosed a tree butt holder for receiving therein and gripping the trunk of a tree. This tree butt holder includes a plate having a height and a width. The plate further has a first notch formed therein for receiving therein the trunk of the tree. This first notch is lined with gripping teeth, such that the teeth grip trunk of the tree. The plate further has a second notch formed therein. The second notch is in communication with the first notch. The second notch is also lined with gripping teeth, such that the teeth grip the trunk of the tree received in the second notch. The second notch is formed having a greater depth in the plate than the first notch and the first notch is formed having a greater width in the plate than the second notch.

In still yet further accordance with the teachings of the present invention, there is disclosed a feller buncher head of the type which is carried by a motorized vehicle for felling a tree having a trunk. This feller buncher head includes a main body having an upper end and a lower end. The lower end is secured to the motorized vehicle permitting vertical pivotal movement of the main body relative to the motorized vehicle between a cutting position and a felling position. A hydraulic power saw is carried by the lower end of the main body for felling the tree. A holder is carried by the main body between the upper and lower ends thereof. This holder extends around and embraces the trunk of the tree. In this fashion, the felled tree is held by the trunk thereof and the main body moved into the felled position. Finally, a hydraulic winch is carried by the motorized vehicle. The winch has a cable, including a first end, which is secured to the upper end of the main body.

These and other objects of the present invention will become apparent from a reading of the following specification, taken in conjunction with the enclosed drawings.

DESCRIPTION OF PREFERRED EMBODIMENTS

Figure 1:
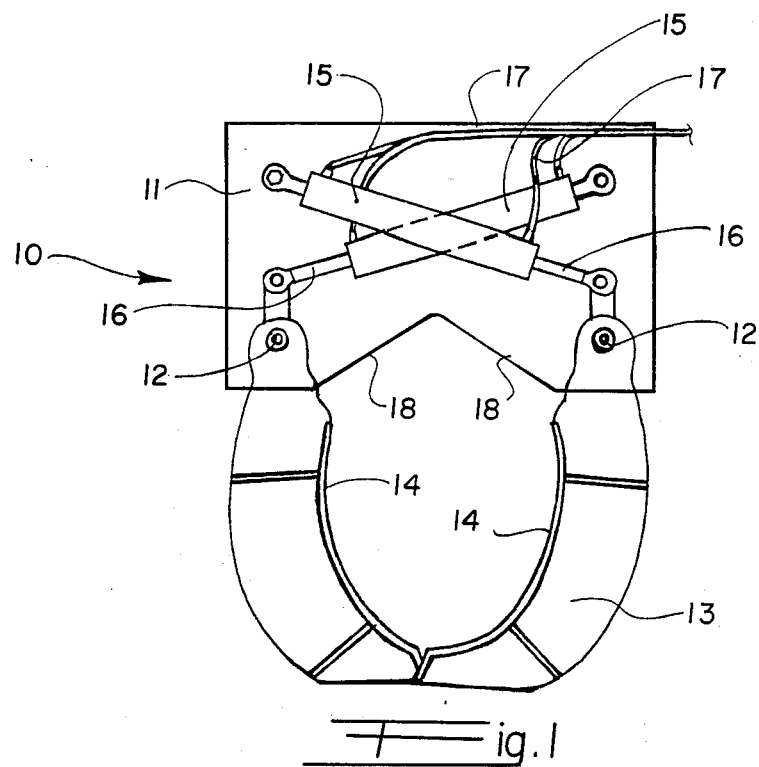
FIG. 1 is a front view of the delimbing head of the present invention with parts thereof broken away for the sake of clarity.
Figure 2:
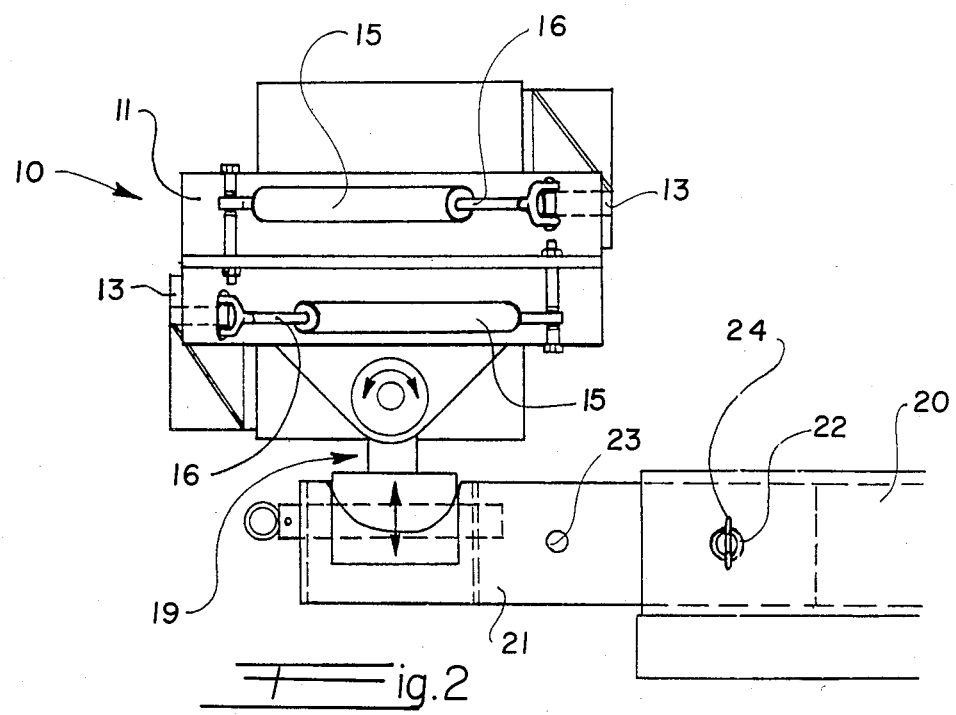
FIG. 2 is a top view of a skidder blade having the delimbing head secured thereto.

Referring now to the drawings and, in particular to FIGS. 1 and 2, the delimbing head 10 is of the type that is carried by a motorized vehicle 1, for removing the limbs 2 from the trunk 3 of a tree 4. As illustrated, the head 10 is removably secured or connected to the blade (skidder blade) 5 of a skidder. It is to be understood however, as will be readily apparent to those skilled in the art, that any suitable motor vehicle capable of carrying and pulling the head 10 down the trunk 3, such as a front end loader, small crawler, "cats", dozers, rubber tired feller bunchers and hydraulic loaders may also suffice. This skidder acts as the power unit for the head 10.

The head 10 includes a housing 11 which is substantially hollow. Pivotally connected to the housing 11 about a pivot point 12 are at least one, and preferably two delimbing jaws 13. Connected thusly, jaws 13 may pivotally move between a first closed delimbing position, wherein the limbs 2 may be removed from the trunk 3 of the tree 4 and a second open releasing position, wherein the trunk 3 of the tree 4 may be removed from the jaws 13.

Each of the jaws 13 are curved in shape, so as to generally conform to the shape of the trunk 3. In the first closed position, the jaws 13 will extend about and wrap around the outer perimeter of the tree trunk 3 in a manner similar to a "by-pass" grapple bucket.

Each of the jaws 13 has a respective cutting edge 14 formed thereon. Preferably, these cutting edges 14 extend along the entire length of the jaw 13 on which they are formed. It is also preferred that each of these cutting edges 14 be oriented, so as to substantially face the other cutting edge 14.

Means for moving the movable delimbing jaw (or jaws) 13 are positioned in the housing 11. Preferably, this means includes a respective cylinder 15 (or cylinders) for each respective pivotal jaw 13. Each of these cylinders 15 has a respective piston 16 slidably disposed therein. Said pistons 16 are, along with the cylinders 15, conventional hydraulic cylinder/pistons whose structure and operation is readily apparent and are well known to those skilled in the art. Operation of these cylinder/pistons is controlled by a specially installed hydraulic valve in the cab of the motor vehicle. This hydraulic valve is connected to the cylinders via hydraulic hoses 17.

The pistons 16 have a respective drive end which extends from the cylinder 15. This drive end is secured to the pivotally connected delimbing jaws 13. In this fashion, sliding movement of the pistons 16 in the respective cylinder 15 pivots the respective jaw 13, to which it is secured, between the first closed and second open positions.

Preferably, the hydraulic cylinders 15 are $2\frac{1}{2}''$ hydraulic cylinders. It is also preferred that the head opens to a size 14" and closes to a size of $4\frac{1}{2}''$. It is further preferred that the head 10 (including the jaws 13 and the cutting edges 14 thereof) be fabricated from $\frac{3}{8}''$ T1 steel, van 80 steel or any other hardened steel.

Preferably, the housing 11 further includes a pair of cutting edges 18 which are formed thereon. It is most desirable that each of said cutting edges 18 be substantially contiguous with a respective cutting edge 14 formed on one of the jaws 13, forming what is substantially one contiguous cutting edge therewith. It is further preferred that, in providing a head 10 which extends about the perimeter of the trunk 3 of a tree 4, that the cutting edges 18 be formed, so as to intersect one another.

Connected between the motorized vehicle and the housing is a four-way swivel 19. This swivel 19 permits the housing 11 having the delimbing jaws 13 carried thereon to oscillate and pivot up and down and side to side. In this fashion, the head floats during the delimbing operation (as shall be discussed later) following the trunk of the tree without binding, as long as there is constant pressure on the delimbing head 10.

Preferably, the swivel 19 is directly connected to the head 10. It is further preferred that the swivel (and thus also the head 10) be indirectly connected to the (for example, the skidder blade 5) motor vehicle 1, such that its positioning thereon may be adjusted. Such adjustable positioning is provided by a substantially hollow mounting tube 20 which is secured to the motor vehicle 1 by any suitable means, such as by being welded to a skidder blade 5. It is preferred that this tube 18 be secured to a side corner of the skidder blade 5.

An extension tube 21 having a first end and a second opposite end, is telescopically, slidably received in the mounting tube 20. This extension tube 21 has a length, including the first end of the extension tube 21, which extends outwardly from the said mounting tube 20. In this fashion, the extension tubes 21 telescopically slide in and out of the respective mounting tube 20. This permits said extension tube 21 to be slidably adjusted in the mounting tube 20 for varying the length of the extension tube 21 extending outwardly therefrom.

The swivel 19 is secured to (carried by) the first end of the extension tube 21. Secured thusly, movement of the extension tube 21 in the mounting tube 20 moves the head 10 in and out of the delimbing and skidding positions, and permits for the positioning of the delimbing head 10 to be adjusted as required.

It is preferred that, as described above, the mounting tube 20 be a 7"×7" tube. It is also preferred that the extension tube 21 be a 6"×6" tube. It is further preferred that both the mounting tube 20 and the extension tube 21 be substantially square, or other similar geometrical shape, in cross-section, so as to substantially preclude relative rotation of the tubes relative to one another.

Finally, means is provided for securing the slidably adjusted extension tube 21 in the mounting tube 20 with the desired adjusted length telescopically extending outwardly therefrom. This means includes at least one aperture 22 which is formed through the mounting tube 20. At least one and, preferably, a plurality of spaced apertures 23 are formed int he extension tube 21. The extension tube 21 may thus be slidably adjusted in the mounting tube 20 for varying the length of the extension tube 21 extending outwardly therefrom, with at least one of the (the desired) spaced apertures 23 being aligned with the aperture 22. When thus aligned, a (at least one) mounting pin 24 may be removably received in both of the aligned apertures 22 and 23, thereby securing the extension tube 21 in its slidably adjusted position. This mounting pin 24 also precludes further sliding (and rotational) movement of the extension tube 21 in the mounting tube 20. The pin 24 may then be subsequently removed to either adjust the head 10 and/or to remove the head 10 entirely from the motor vehicle (the skidder) 1.

Figure 3:
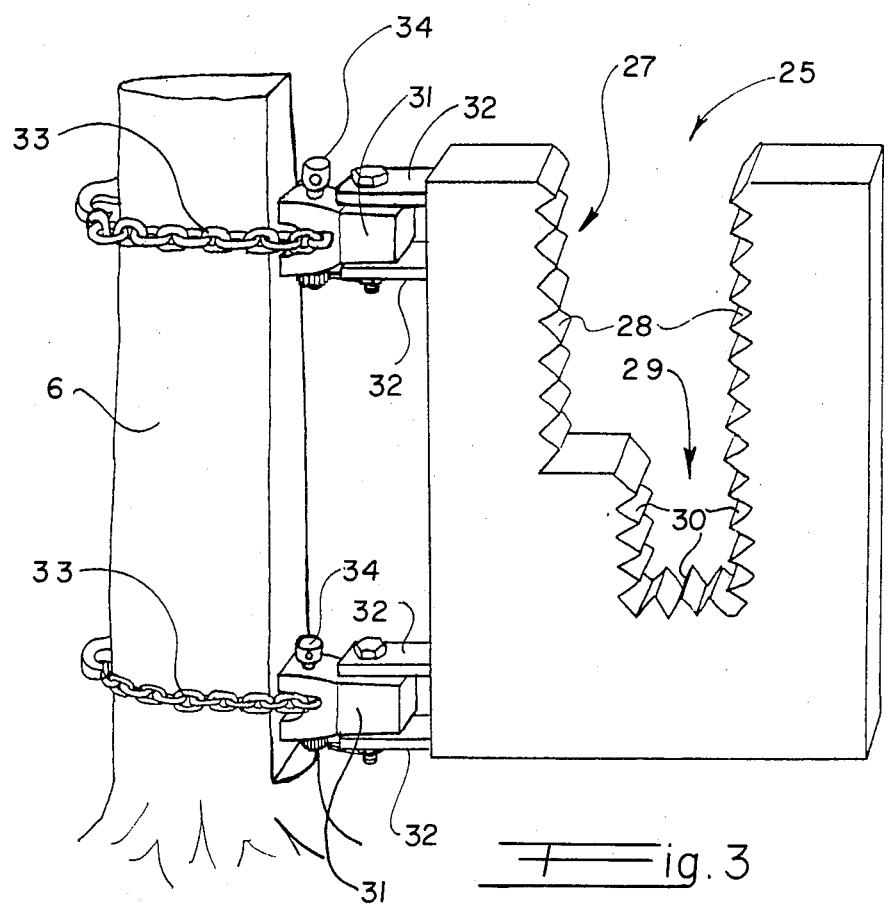
FIG. 3 is a front view of the tree butt holder of the present invention secured to a tree trunk support.
Figure 4:
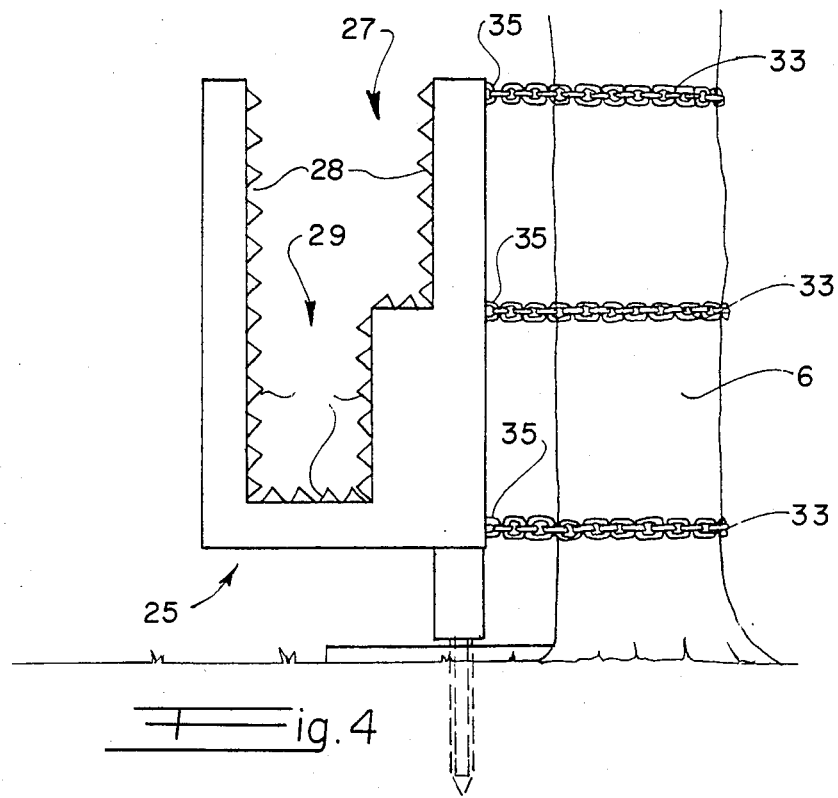
FIG. 4 is a front view of another embodiment of the tree butt holder which is also secured to a tree trunk support.
Figure 5:
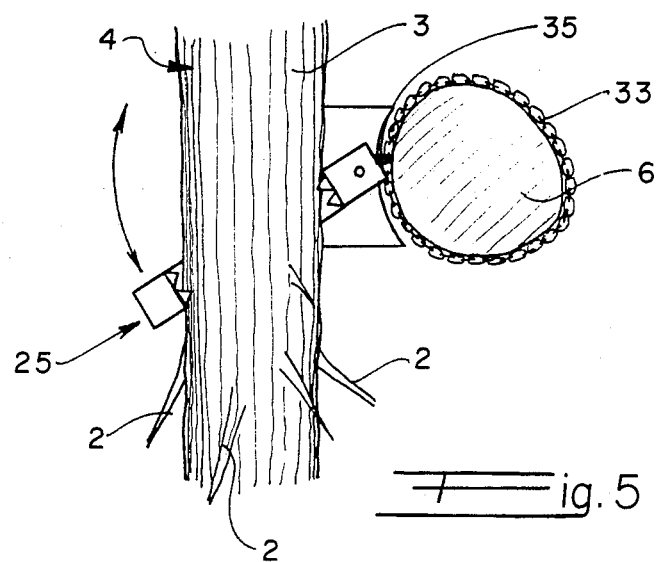
FIG. 5 is an overhead view of the tree butt holder of FIG. 3 having a tree trunk received and gripped therein.

Referring now to FIGS. 3-5, the tree butt holder 25 for receiving therein and gripping the trunk 3 of a tree 4 is illustrated.

The tree butt holder 25 is a plate 26 having a height and a width. Formed in this plate 26 is a first notch 27. The trunk 3 of a tree 4 to be held is received in this first notch 27. The first notch 27 is lined with a plurality of gripping teeth 28, such that when the trunk 3 is received in the first notch 27, the teeth 28 grip the trunk 3 of the tree, holding the tree butt in place.

The plate 26 also has a second notch 29 formed therein. This second notch 29 is in communication with the first notch 27. Like the first notch 27, this second notch 29 is also lined with a plurality of gripping teeth 30. In this fashion, when the trunk 3 is received in the second notch 29, the teeth 30 grip the trunk 3 holding the tree butt and securing it in place.

Preferably, the second notch 29 has a greater depth in the plate 26 than the first notch 27. It is also preferred that the first notch 27 have a greater width in the plate 26 than the second notch 29. By way of example only, the plate 26 has a depth of 22" and a width of 23". The width of the first notch 27 is preferably 14" and the width of the second notch is 9". The depth of the first notch 27 is 12" and that of the second notch 29 is 18". As will be readily understood by those skilled in the art, the dimensions noted above are primarily arbitrary and may be varied and adjusted as needed.

The tree butt holder 25 also has a means for being secured to a support 6. This support 6 may be as is shown in the drawings, the trunk 3 of a tree 4; or any other suitable support, such as a logging trunk with a loader mounted on it. It is especially preferred that the support 6 be a tree having a flattened vertical portion cut therein. This (as will be discussed later) keeps the device 25 from spinning around the support 6.

The means for securing the tree butt holder 25 includes at least two (a pair) of spaced part mounting blocks 31. An equal number of spaced apart mounting hinges 32 are secured to and carried by, the plate 26. Preferably, one hinge 32 is secured to the upper portion of one side of the plate 26 while the other hinge 32 is secured to the lower portion of the same one side of the plate 26.

Each hinge 32 is pivotally secured to a respective mounting block 31. In this fashion, the plate 26 swings like a gate on the hinges 32 about the mounting blocks 31, binding the tree trunk (butt) 3 when it is pulled or pushed or after being received in one of the notches 27 or 29 and being gripped by teeth 28 or 30.

A pair of chains (preferably being ⅜" high test chains) 33 are provided. Each chain 33 is secured to a respective mounting block 31 and extends around the tree trunk 3, so that the blocks 31 having the plate 26 pivotally secured thereto is supported by the support 6.

Finally, a pair of chain tightening ratchets 34 are provided. Each ratchet 34 is carried by a respective mounting block 31. Positioned thusly, each ratchet 34 may be utilized to tighten a respective chain 33 thereby tightly securing and anchoring the plate 26 to the support 6. The construction and operation of these ratchets 34 are well known to those skilled in the art.

Alternatively, the plate 26 may be secured to the support 6 by the use of chains 33 and dogs 35 (FIG. 4).

Figure 6:
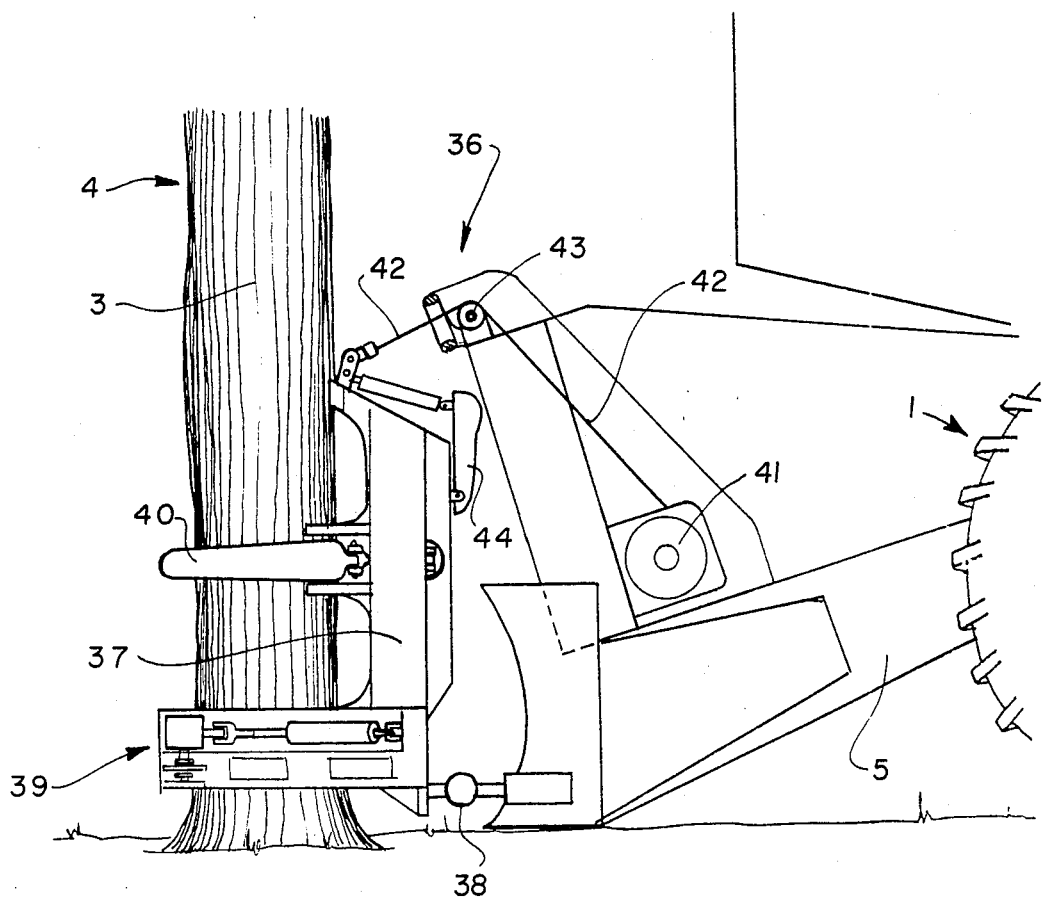
FIG. 6 is a side view of the feller buncher head of the present invention during the operation thereof.

Referring now to FIG. 6, the feller buncher head 36 is also of the type which is carried by a motorized vehicle (such as the blade of a skidder) 1 for felling a tree 4 having a trunk 3.

A main body 37 having an upper end and a lower end is secured, at the lower end thereof, to the (skidder blade of a) motorized vehicle 1 by any suitable means, such as a trailer hitch 38, for vertical pivotal movement thereof relative to the motorized vehicle 1 between a cutting position and a felling position. This allows the felling tool 36 to swivel and swing freely when being dragged. It also permits the quick removal of the feller buncher head 36 from the motorized vehicle 1.

Carried on the lower end of the main body 37 is a power saw 39. This power saw 39 is provided for felling the tree 4. Preferably, this power saw 39 is a hydraulic power saw 39.

A holder 40 is carried by the main body 37 between the upper and lower ends thereof. This holder 40 extends around and embraces the trunk of the tree 4, with both of its ends secured to the body 37. Positioned thusly (in the cutting position), this holder 40 holds the tree 4 being felled and can be utilized to carry the felled tree 4, utilizing the motorized vehicle 1 as a power unit therefor. It is to be understood that this holder 40 holds the felled tree 4 by the trunk 3 thereof, so that the main body 37 is pivotally moved about the trailer hitch 38 into the felled position.

Finally, means is provided for pivotally returning the main body 37 to the cutting position about the hitch 38. This means includes a hydraulic winch 41 which is secured to and carried by the motorized vehicle 1, on preferably, the skidder blade 5 thereof. This winch 41 has a cable 42 which is rolled onto and off of the winch 41. The cable 42 has a first end which is secured to the upper end of the main body 37. It is preferred that a roller groove 43 receive and guide the cable 42, being positioned between the winch 41 and the main body 37. Finally, a pusher 44 is also secured to, and carried by, the upper end of the main body 37.

Formed as described above, rotational movement of the winch 41 rolls the cable 42 onto the winch 41, thereby pivoting the main body 37 (about the trailer hitch 38) from the felled position and into the cutting position.

Figure 7:
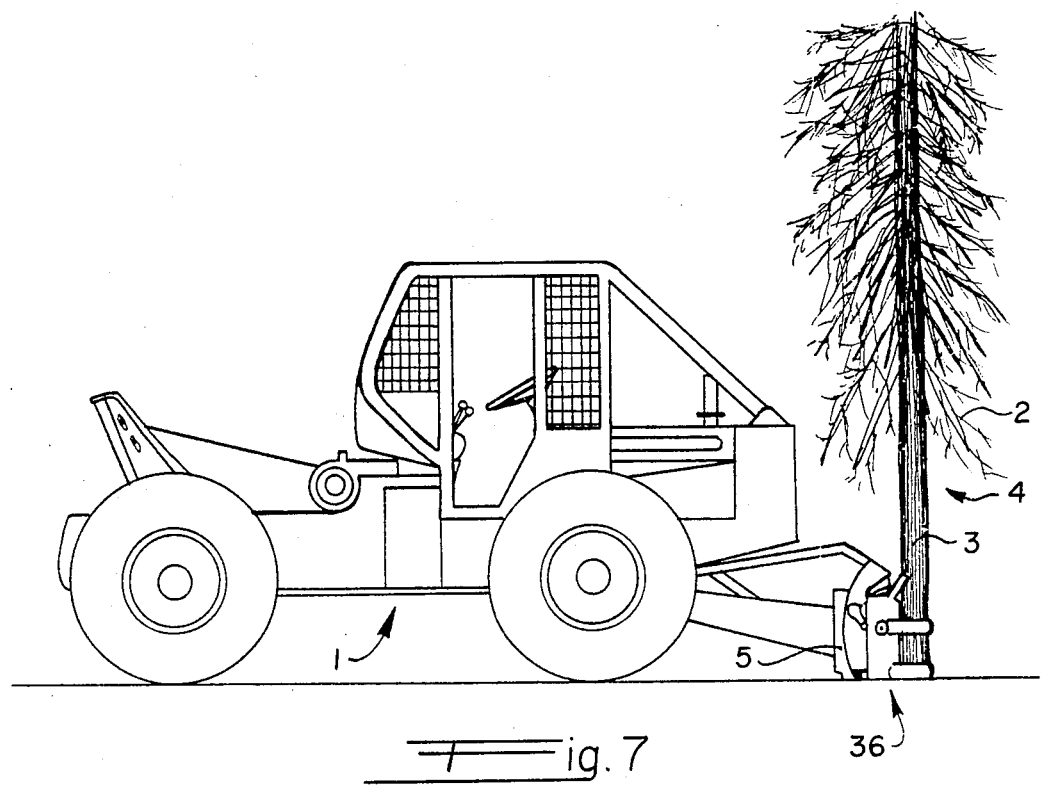
FIGS. 7 and 8 are side views illustrating the operation of the feller buncher head of the present invention.
Figure 8:
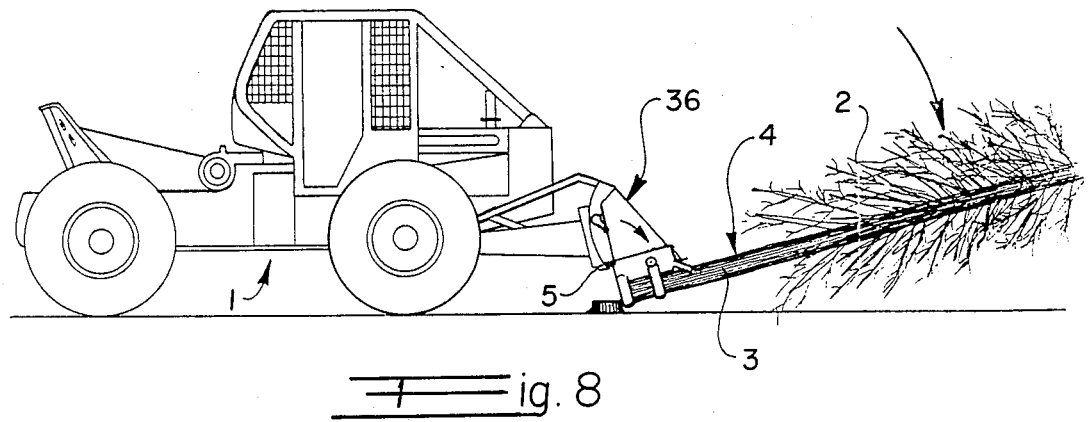

Referring now to FIGS. 7 and 8, operation of a skidder-mounted feller buncher head 36 is illustrated. This head 36 is utilized to cut down and drag trees 4 to bundles and/or the tree butt holder 25, described above. First, the head 36 is aligned with the trunk 3 of the tree 4 to be felled. Next, the holder 40 is secured with the body 37 in the cutting position, so as to extend about and embrace the trunk of the tree (FIG. 7). Next, the tree 4 is cut and felled utilizing the hydraulic saw 39. After the tree 4 is cut, the holder 40 holds onto the tree 4, allowing the tree 4 to fall freely to the ground. The falling motion of the tree 4 pivots the main body 37 about the trailer hitch 38, so that the main body 37 is now in the felled position (FIG. 8). The motorized vehicle 1 is then utilized as a power unit for dragging the tree 4 to a desired location with the felling head 36 in the felled position, and for placing the tree 4 in a desired location such as a bundle or in the tree butt holder 25.

Once the felled tree 4 is placed in the desired location, the holder 40 may be unsecured from the tree 4 and the main body 37 of the feller head 36 is retrieved (returned) to the cutting position by use of the cable 42 and the hydraulic winch 41.

Figure 9:
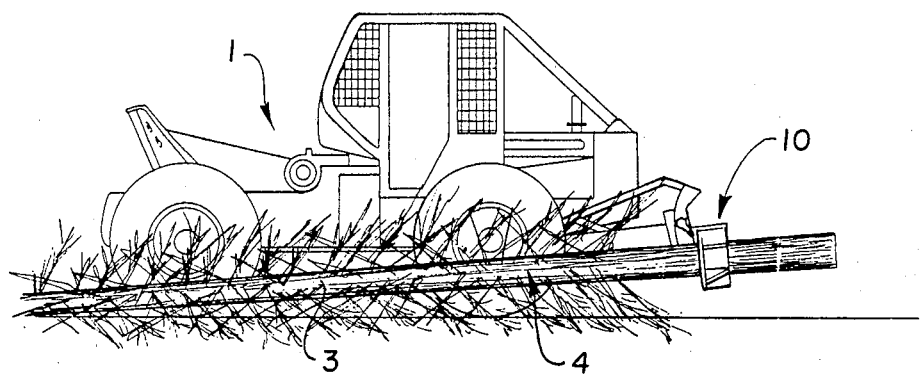
FIGS. 9 and 10 are side views illustrating the use of the delimbing head of the present invention in conjunction with the tree butt holder.
Figure 10:
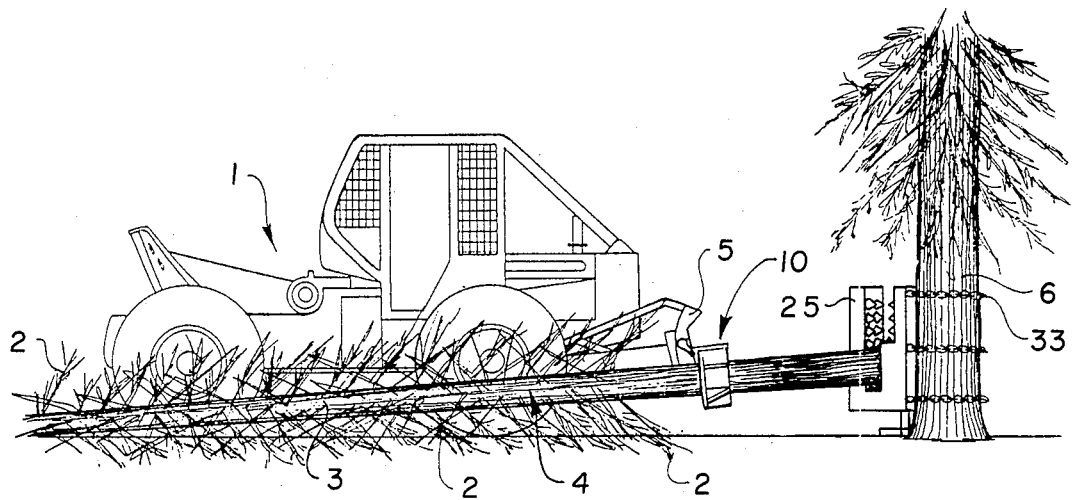

Referring now to FIGS. 9-10, the coordinated operation of the tree butt holder 25 and the delimbing head 10 is illustrated. First, the tree butt holder 25 is secured to a solid standing support (such as a tree) 6 by the chains 33. The chains 33 are tightened by the ratchets 34, so that the holder 25 swings like a gate on the hinges 32.

Next, the delimber head 10 is secured and adjusted to the power unit 1 which, in this case, is a skidder blade. The delimber head 10 may then be utilized to load the tree butt holder 25 from the top, so that the tree trunk 3 is received in either the first or second notches 27 or 29. Preferably, the head 10 grips the trees 6-8 feet back from the tree butt. The tree trunk is placed in the holder 25 when the holder 25 is centered. The operator then either backs up or moves the skidder forward, such that the tree is moved forward or backward causing the teeth 28 or 30 to grip the tree 4, thereby binding on the tree trunk, holding the tree 4 secure for subsequent operations.

With the tree trunk 3 being securely held, either as described above or in any other manner whatsoever, the delimbing operation may be carried out. First, the jaws 13 are closed about the trunk 3 of the tree 4. Next, the delimbing head 10 is backed down the tree stem 3, closing the head 10 around the tree 4 as the tree stem 3 gets smaller. When the delimbing head 10 is pulled down the tree, the cutting edges 14 and 18 on the head 10 will cut the limbs 2 free from the tree 4. It is to be understood that limbs 2 can be removed by either a forward or backward motion of the delimbing head 10. This delimbing operation is conducted at least 1-2 times, as required, to satisfactorily remove all the limbs 2 from the tree 4.

Once the tree 4 has been delimbed, the tree butt holder 25 should be centered, with no forward or backward pressure. The delimbed tree is then gripped by the head 10 6-8 feet back of the butt and is lifted up and out of the holder 25. The head 10 is then utilized to drag the delimbed tree to a predetermined site, where it is piled by stacking etc. in a bundle, or landing etc.

Finally, when finished, the head 10 may be removed from the motorized vehicle 1 by removal of the mounting pin 24 and by slidably removing the extension tube 21 from the mounting tube 20, freeing the motorized vehicle 1 to be utilized in other ways.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. A delimbing head of the type carried by a motorized vehicle for removing limbs from the trunk of a tree, comprised of:
    a housing;
    a pair of delimbing jaws, at least one of said jaws pivotally connected to the housing about a pivot point for pivotal movement between a first closed delimbing position and a second open releasing position, each of said jaws having a respective cutting edge formed thereon, each of said cutting edges being oriented facing the other said cutting edge;
    means for moving the delimbing jaw between the first closed position and the second open position; and
    a four-way swivel connected between the motorized vehicle and the housing, such that the housing having the delimbing jaws carried thereon pivots up and down and side to side, such that in the first closed delimbing position the head floats following the trunk of the tree without binding.

2. The delimbing head of claim 1, wherein the means for moving the delimbing jaw is comprised of:
    a cylinder having a piston slidably disposed therein, said piston having a drive end extending from the cylinder and secured to the pivotally connected delimbing jaw, such that sliding movement of the piston pivots the jaw between the first closed and second open positions.

3. A delimbing head of the type carried by a motorized vehicle for removing limbs from the trunk of a tree, comprised of:
    a housing;
    a pair of delimbing jaws, each of said jaws pivotally connected to the housing about a respective pivot point for pivotal movement between a first closed delimbing position and a second open releasing position, each of said jaws having a respective cutting edge formed thereon, each of said cutting edges oriented facing the other cutting edge;

means for moving the delimbing jaws between the first closed delimbing position and the second open releasing position; and a four-way swivel connected between the motorized vehicle and the housing, such that the housing having the delimbing jaws carried thereon pivots up and down and side to side, such that when in the first delimbing position the head floats following the tree trunk without binding.

4. The delimbing head of claim 3, wherein the means for moving the delimbing jaws, is comprised of:

a pair of cylinders, each cylinder having a respective piston slidably disposed therein, each piston having a drive end extending from the cylinder and being secured to a respective delimbing jaw, such that the sliding movement of each piston pivots one of the jaws therewith between the first closed and the second open positions.

5. The delimbing head of claim 3, further comprised of the housing further including a pair of cutting edges formed thereon, each of said cutting edges being substantially contiguous with a respective cutting edge formed on a delimbing jaw.

6. The delimbing head of claim 3, further comprised of:

a substantially hollow mounting tube secured to the motorized vehicle;

an extension tube having a first end and a second opposite end, said extension tube being telescopically slidably received in the mounting tube having a length including the first end extending outwardly therefrom, such that the extension tube may be slidably adjusted in the mounting tube for varying the length of the extension tube extending outwardly therefrom;

the swivel being secured to the first end of the extension tube; and means for securing the slidably adjusted extension tube in the mounting tube with the length telescopically extending outwardly therefrom.

7. The delimbing head of claim 6, wherein the means for securing the slidably adjusted extension tube in the mounting tube is comprised of:

at least one aperture formed through the mounting tube;

a plurality of spaced apertures formed in the extension tube, such that the extension tube may be slidably adjusted in the mounting tube for varying the length of the extension tube extending outwardly therefrom with at least one of the spaced apertures formed in the extension tube being aligned with the aperture of the mounting tube; and at least one mounting pin removably received in both the aperture formed in the mounting tube and the aperture of the extension tube aligned therewith, securing the extension tube in its slidably adjusted position, thereby precluding further movement of the extension tube in the mounting tube.

8. A delimbing head of the type carried by a motorized vehicle for removing limbs from the trunk of a tree, comprised of:

a housing;

a pair of delimbing jaws, each of said jaws pivotally connected to the housing about a respective pivot point for pivotal movement between a first closed delimbing position and a second open releasing position, each of said jaws having a respective cutting edge formed thereon, each of said cutting edges oriented facing the other cutting edge;

a pair of cylinders, each cylinder having a respective piston slidably disposed therein, each piston having a drive end extending from the cylinder and secured to a respective delimbing jaw, such that the sliding movement of each piston pivots one of the jaws therewith between the first closed and the second open positions;

a four-way swivel connected between the motorized vehicle and the housing, such that the housing having the delimbing jaws carried thereon pivots up and down and side to side, such that when in the first delimbing position the head floats following the tree trunk without binding;

the housing further including a pair of cutting edges formed thereon, each of said cutting edges being substantially contiguous with a respective cutting edge formed on a delimbing jaw;

a substantially hollow mounting tube secured to the motorized vehicle;

an extension tube having a first end and a second opposite end, said extension tube being telescopically slidably received in the mounting tube having a length including the first end extending outwardly therefrom, such that the extension tube may be slidably adjusted in the mounting tube for varying the length of the extension tube extending outwardly therefrom;

the swivel being secured to the first end of the extension tube;

at least one aperture formed through the mounting tube;

a plurality of spaced apertures formed in the extension tube, such that the extension tube may be slidably adjusted in the mounting tube for varying the length of the extension tube extending outwardly therefrom with at least one of the spaced apertures formed in the extension tube being aligned with the aperture of the mounting tube; and at least one mounting pin removably received in both the aperture formed in the mounting tube and the aperture of the extension tube being aligned therewith, securing the extension tube in its slidably adjusted position, thereby precluding further movement of the extension tube in the mounting tube.

* * * * *